United States Patent
Fischer et al.

(10) Patent No.: US 9,212,302 B2
(45) Date of Patent: Dec. 15, 2015

(54) METHOD FOR PRODUCING ZIRCONIA-REINFORCED ALUMINA GRAINS, IN PARTICULAR ABRASIVE GRAINS, AND GRAINS PRODUCED BY SUCH METHOD

(71) Applicant: VSM • Vereinigte Schmirgel-und Maschinen-Fabriken, Hannover (DE)

(72) Inventors: Gerd Fischer, Hannover (DE); Clemens Megerle, Hannover (DE); Wolfgang Falz, Seelze (DE)

(73) Assignee: VSM•Vereinigte Schmirgel-und Maschinen-Fabriken AG, Hannover (DE)

( * ) Notice: Subject to any disclaimer, the term of this patent is extended or adjusted under 35 U.S.C. 154(b) by 68 days.

(21) Appl. No.: 13/858,786

(22) Filed: Apr. 8, 2013

(65) Prior Publication Data

US 2013/0283705 A1    Oct. 31, 2013

Related U.S. Application Data (63) Continuation of application No. PCT/DE2011/001804, filed on Oct. 6, 2011.

(30) Foreign Application Priority Data

Oct. 6, 2011   (DE) .......................... 10 2010 047 690

(51) Int. Cl.
| | |
|---|---|
| *C04B 35/119* | (2006.01) |
| *C09K 3/14* | (2006.01) |
| *B82Y 30/00* | (2011.01) |
| *C04B 35/109* | (2006.01) |

(52) U.S. Cl.
CPC ............... *C09K 3/1427* (2013.01); *B82Y 30/00* (2013.01); *C04B 35/109* (2013.01); *C04B 2235/3225* (2013.01); *C04B 2235/3229* (2013.01); *C04B 2235/3418* (2013.01); *C04B 2235/781* (2013.01)

(58) Field of Classification Search
CPC ..................... C04B 35/119; C04B 2235/3217; C09K 3/14
See application file for complete search history.

(56) References Cited

U.S. PATENT DOCUMENTS

| | | |
|---|---|---|
| 3,891,408 A | 6/1975 | Rowse et al. |
| 4,073,096 A | 2/1978 | Ueltz et al. |
| 4,623,364 A | 11/1986 | Cottringer et al. |

(Continued)

FOREIGN PATENT DOCUMENTS

| | | |
|---|---|---|
| DE | 15 19 747 | 2/1970 |
| DE | 26 53 034 | 6/1977 |

(Continued)

*Primary Examiner* — Pegah Parvini
(74) *Attorney, Agent, or Firm* — Shlesinger, Arkwright & Garvey LLP

(57) ABSTRACT

Method for producing zirconia-reinforced $Al_2O_3$ grains, including at least the following steps: inductively melting a starting mixture to form a eutectic melt made of alumina and zirconia; applying the eutectic melt as a thin layer material, the thin layer material being quenched; and removing the thin layer material. In this manner abrasive grains can be formed directly or the thin layer material can be classified when it is broken into abrasive grains, the grains are polycrystalline without amorphous glass phases as an alumina matrix having zirconia precipitations, and at least some of the zirconia precipitations can be formed in the nanoscale range.

23 Claims, 4 Drawing Sheets

(56) References Cited

U.S. PATENT DOCUMENTS

| | | |
|---|---|---|
| 5,227,104 A | 7/1993 | Bauer |
| 5,383,945 A | 1/1995 | Cottringer et al. |
| 5,395,407 A | 3/1995 | Cottringer et al. |
| 5,514,631 A | 5/1996 | Cottringer et al. |
| 7,168,267 B2 | 1/2007 | Rosenflanz et al. |
| 7,501,001 B2 | 3/2009 | Rosenflanz et al. |
| 8,003,217 B2 | 8/2011 | Rosenflanz |
| 2004/0148967 A1 | 8/2004 | Celikkaya et al. |
| 2005/0060948 A1 | 3/2005 | Rosenflanz |
| 2005/0137077 A1* | 6/2005 | Bange et al. ............... 501/127 |
| 2008/0028685 A1 | 2/2008 | Marlin |
| 2013/0283705 A1 | 10/2013 | Fischer et al. |

FOREIGN PATENT DOCUMENTS

| | | |
|---|---|---|
| DE | 699 17 490 T2 | 6/2005 |
| EP | 2625153 | 8/2014 |
| GB | 1120648 | 7/1968 |
| WO | WO 94/02559 | 2/1994 |
| WO | WO 03/011776 A1 | 2/2003 |
| WO | WO 03/011782 A2 | 2/2003 |
| WO | WO 2004/071975 A2 | 8/2004 |
| WO | PCT/DE2011/001804 | 4/2012 |
| WO | WO 2012/045302 A3 | 4/2012 |

* cited by examiner

METHOD FOR PRODUCING ZIRCONIA-REINFORCED ALUMINA GRAINS, IN PARTICULAR ABRASIVE GRAINS, AND GRAINS PRODUCED BY SUCH METHOD

CROSS-REFERENCE TO RELATED APPLICATIONS

This application is a continuation of application no. PCT/DE2011/001804, filed Oct. 6, 2011, which claims the priority of German Application No. 10 2010 047 690.0, filed Oct. 6, 2010, and each of which is incorporated herein by reference.

FIELD OF THE INVENTION

The invention relates to a method for producing polycrystalline zirconia-reinforced alumina grains, and a grain, in particular an abrasive grain, thus produced.

BACKGROUND OF THE INVENTION

Zirconia-reinforced alumina, also referred to as zirconia-toughened alumina (ZTA), has a matrix composed of alumina ($Al_2O_3$) with reinforcements by $ZrO_2$ precipitates for increasing the breaking strength and in particular the self-sharpening capability.

In the alumina ($Al_2O_3$) and zirconia ($ZrO_2$) two-material system, in addition to these types of ZTA materials, zirconia materials containing additional alumina, among other materials, are known which thus essentially have a zirconia matrix. Furthermore, materials having amorphous phases or glass phases are known which differ from polycrystalline materials.

Polycrystalline alumina materials may be produced, for example, by pressing a green compact with subsequent sintering to form ceramic. In addition, the formation of polycrystalline materials from a melt is known from DE 26 53 034 A1, for example. The melting of alumina requires high temperatures, the aim in general being to achieve melt temperatures above 2100° C. For this purpose, according to DE 26 53 034 A1 a Higgins furnace is used, in which an electric arc furnace generates the required temperatures. It is proposed to remove the melt not by tipping a crucible, but, rather, to continuously pass cooled, bottle-like bodies through the melt bath, so that material in the melt precipitates due to abrupt cooling on the surface of the bodies, and may subsequently be knocked off by mechanical action. Formation of a eutectic melt composed of $Al_2O_3$ and $ZrO_2$ is also described.

However, these types of electric arc furnaces require large amounts of energy. To make effective use of the energy, large charges are generally heated. The production therefore often takes place in areas with inexpensive energy, for example hydroelectric power, or utilizing existing power plant capacities in times of low consumption, for example at night.

DE 699 17 490 T2 describes another method for producing alumina-zirconia abrasive grains, in which a starting material is melted by an electric arc melting process. U.S. Pat. No. 3,891,408 A and US 2008/0028685 A disclose further electric arc melting processes. Charges of several hundred kilograms of the solid starting material are melted and removed in batches. Distances between the zirconia precipitates of approximately 4000 angstrom (400 nm), for example, are achieved in these types of methods.

In electric arc melting processes, the removal is generally carried out by interrupting the electric arc and removing the melt by tipping, for example, when measures as in DE 26 53 034 A1 cited above are not taken. Thus, use of these types of technologies is expensive. In addition, the production of limited charges, for example for producing specific abrasives, is generally ineffective.

WO 2004/071975 A2 describes the production of abrasive grains made of glass-ceramic materials having a triangular shape. For this purpose, solid starting materials containing $Al_2O_3$ and additives such as rare earth oxides and zirconia are melted, and the melt is subsequently introduced between two counter-rotating rollers, by means of which the abrasive grains having the desired triangular shape are directly formed from a glass-ceramic material.

The formation of abrasive grains having a suitable shape is also known from EP 6 521 778 B1, for example, which describes a sol-gel method (thickening of a suspension instead of melting the material).

DE 15 19 747 C describes a method for the inductive melting of oxide ceramics, using an inductive melting process. For the initiation, a metallic auxiliary material is initially supplied which ensures the required conductivity, until a portion of the ceramic material is melted and the resulting melt is conductive. The material is melted in a crucible and subsequently solidifies.

OBJECTS AND SUMMARY OF THE INVENTION

An object of the invention is to provide a method for producing polycrystalline zirconia-reinforced alumina abrasive grains which allows relatively cost-effective production with good material properties. In addition, corresponding abrasive grains are provided.

This object is achieved by a method according to claim 1, and by an abrasive grain thus produced according to claim 12. The subclaims describe preferred further embodiments.

Thus, according to the invention, solid starting material is inductively melted to form a eutectic melt composed of aluminum oxide and zirconium dioxide. The eutectic melt is subsequently directly quenched as a thin layer material. According to the invention, a eutectic melt composed of aluminum oxide and zirconium dioxide is understood to mean a melt which in a manner known per se contains approximately 54 to 61 weight percent $Al_2O_3$ and correspondingly 39 to 46 weight percent $ZrO_2$, wherein in a manner known per se a smaller portion of the $ZrO_2$ may also be replaced by the chemically equivalent $HfO_2$. The eutectic melt may optionally contain, in a manner known per se, common stabilizers or additives, for example ceroxide, rare earth oxides, or silicon dioxide, so that the weight ranges of 54 to 61 weight percent $Al_2O_3$ and 39 to 46 weight percent $ZrO_2$ are correspondingly reduced or modified. It is important that a eutectic melt is formed which forms a homogeneous mixing phase having the range with the lowest solidification temperature of the alumina-zirconia system.

Thus, according to the invention, a relatively low melting temperature is made possible. It has also been shown that according to the invention, abrasive grains composed of polycrystalline material having very good properties may be formed by quenching from this eutectic melt.

According to one particularly preferred design, the inductive melting may take place in such a way that an existing melt is inductively heated, and solid starting material is supplied to this melt. Thus, according to the invention, the initiating chemical reactions generally required at the start of an inductive melting process may be avoided in the continuous process. Solid alumina material or corundum material is electrically nonconductive, and therefore cannot be inductively heated initially; therefore, in the start-up process, in order to avoid supplying metal as in DE 15 19 747 C, local melting by a chemical redox reaction, for example, is initially carried out to produce an initial melt. Thus, when individual charges are melted in a crucible and subsequently emptied by tipping, for example, a new initiating melting process may once again be necessary, resulting in a discontinuous, costly method.

In contrast, according to the invention an existing inductively heated melt may be maintained by continuously supplying the solid starting material. The molten material may be removed from the crucible without completely emptying the crucible.

The melt may advantageously be continuously removed, i.e., not discontinuously as by tipping a crucible or by introducing cooling bodies into a melt. Instead, according to the invention the melt may be removed in a continuous discharge process, for example from a suitable outlet of the crucible, for example as overflow, in order to directly quench the melt as a thin layer material.

In addition, when an overflow is used, no relevant conveying devices are necessary; the continuous removal of the melt may take place automatically by continuously supplying the solid starting material.

This type of continuous removal is not possible in electric arc furnaces, for example, during operation, since electrical current flows through the melt, and the melt is therefore received in an insulated crucible until the current is switched off.

Thus, an advantageous synergistic effect results by using an inductive melting process having continuous supply of starting material and removal of liquid melt in order to form the ceramic grains.

Since inductive heating takes place according to the invention, smaller quantities may also be processed, unlike the case for electric arc furnaces, thus allowing flexible production of specific charges. Thus, for example, even charges having less than 100 kg, in particular less than 50 kg, material may be introduced into the crucible.

Thus, in particular for continuous removal, very small quantities may be removed, with the capability of achieving high cooling rates. In this regard, it is recognized that such high cooling rates result in smaller segregations of zirconia precipitates in the alumina matrix, and in addition the distance between the zirconia precipitates may be reduced, for example to less than 250 nm, in particular less than 200 nm. As a result of the smaller distances, in particular the self-sharpening capability and thus the abrasive behavior as an abrasive is also improved, since the zirconia precipitates are cast off during a grinding operation and allow the formation of sharp edges.

The temperature gradients, which result in this type of rapid cooling and the small distances between the zirconia precipitates, are determined by the melt temperature of 1800° to 2000° C., for example, the temperature of the absorbing walls, and the layer thickness of the layer that is formed.

The layer thickness of the layer material may be less than 2 mm, preferably less than 1 mm, for example in the range of 0.1-0.8 mm, which thus directly corresponds to an abrasive grain thickness.

Thus, the method according to the invention allows a specific formation of the grains which is suited in particular for use as abrasive grains.

Furthermore, as a result of melting smaller quantities which is made possible according to the invention, a smaller amount of heat retention energy is required. In particular for the case of continuous supplying of material and the continuous removal of the melt, the particular quantity of melt for which heat is retained may be kept very low according to the mode of operation of a continuous flow heater, whereas the batchwise melting and removal processes of the prior art, such as for a storage heater (boiler), require a high heat retention energy.

Another advantage of the inductive melting is that, unlike the electric arc process, in which the graphite electrodes are immersed in the melt for agitation, no contact with the melt is necessary, and therefore impurities may be avoided.

According to one embodiment according to the invention, the thin layer material may be a thin layer having a fairly large surface area, i.e., a plate-like layer material which due to the small layer thickness quickly solidifies on the conveyor belt and may be subsequently removed, whereby the layer material has already broken up to a great extent and subsequently may be further mechanically crushed if necessary, so that it may be then be subdivided by classifying in suitable layer thickness ranges. The small layer thickness allows instantaneous quenching on the conveyor belt.

According to an alternative embodiment, however, the melt may also be used directly for forming abrasive grains, as is known from WO 2004/071975 A2. The direct formation of flat, small abrasive grains having a thickness less than 1 mm, in particular 0.1 to 0.8 mm, thus allows a quench process which, unlike in WO 2004/071975 A2, takes place according to the invention from a eutectic melt and is used for forming polycrystalline abrasive grains.

By supplying the melt continuously according to the invention, a melt ridge which forms above the contact area of the two rollers or in front of a stripping apparatus of the conveyor belt, and which could result in slower cooling of the melt material and possibly premature solidification, may be kept small; in any case, a linear or punctiform melt ridge is thus formed.

Furthermore, it is recognized according to the invention that use of the eutectic melt and the continuous feed process may be combined in a particularly suitable manner with the use of a hot roller, heated to 1000 to 1600° C., for example, and a cold roller which is water-cooled, for example. Indentations for the abrasive grains are formed in the surface of the cold roller, so that the charged melt undergoes cooling from the bottom side and all side surfaces, thus allowing a rapid quenching process. In contrast, the hot roller has a smooth surface, and is used for shaping the surface. By use of the hot roller, the cooling may be kept even lower in the melt ridge, which is already small anyway, in particular for a linear or punctiform melt ridge area.

Due to this combination of the eutectic melt, which allows a low solidification temperature, with the continuous melt feed and this roller system, a special combination of suitable measures is achieved which surprisingly results in abrasive grains having excellent material properties. It has been shown that the segregation of zirconia in the alumina matrix, in particular in the corner areas of the shaped abrasive grains, results in small segregations, in particular nanoscales below 100 nm, preferably below 50 nm. These nanoscales in the corner areas are due to the quenching process of a eutectic melt which takes place particularly quickly here, and result in very good abrasive behavior, so that specifically the mechanically stressed corner areas have excellent grinding properties.

Thus, according to the invention, an abrasive having multiple grains formed from a melt and having essentially the same shape is provided which, for example, is incorporated on a carrier together with binder.

The invention is explained below based on several embodiments with reference to the accompanying drawings, in which:

DETAILED DESCRIPTION OF THE INVENTION

Figure 1A:
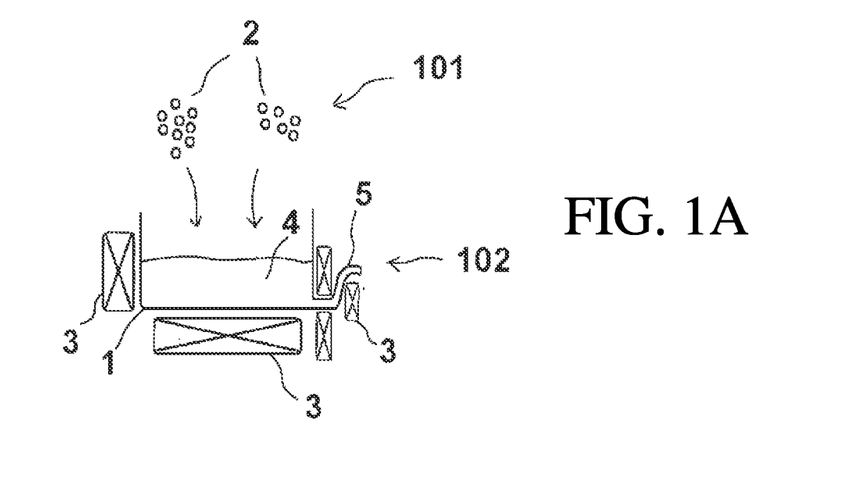
FIG. 1A shows a step 101 and a step 102 of a first embodiment of a method for forming abrasive grains.
Figure 1B:
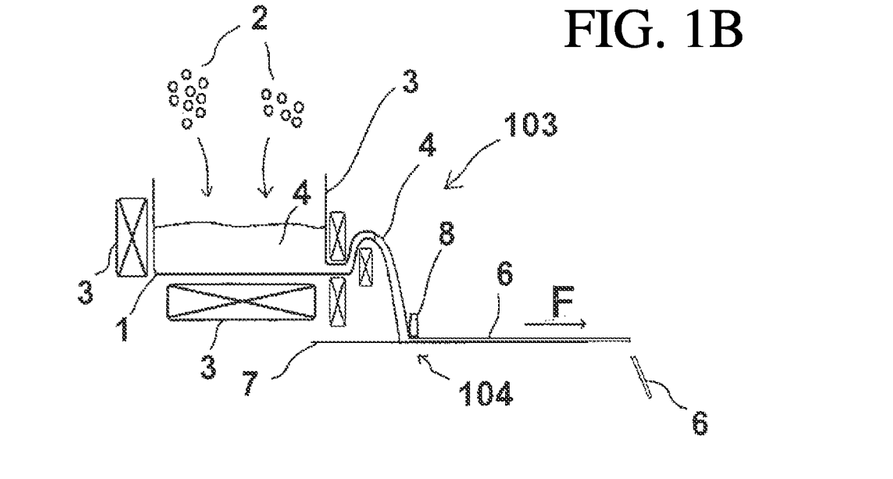
FIG. 1B shows a step 103 and a step 104 of the first embodiment of a method for forming abrasive grains.
Figure 1C:
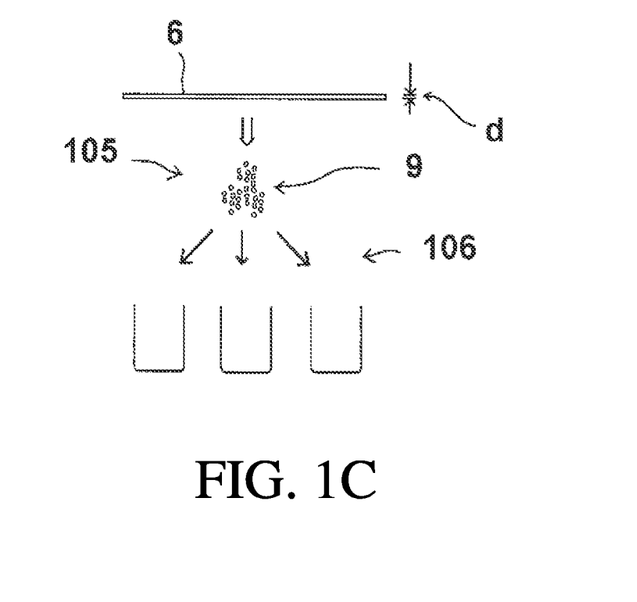
FIG. 1C shows a step 105 and a step 106 of the first embodiment of a method for forming abrasive grains.

FIGS. 1a) through c) show the successive production steps of a method according to a first embodiment of the invention. According to FIG. 1a), a solid starting mixture 2 containing aluminum oxide ($Al_2O_3$) or aluminum oxide compounds as well as zirconia ($ZrO_2$) or zirconia compounds, or in each case the precursors thereof, is charged into a crucible 1.

An induction heating apparatus 3 is situated outside the crucible 1, thus forming an induction furnace. An electrically conductive eutectic melt 4 composed of $Al_2O_3$ and $ZrO_2$ is accommodated in the crucible 1 and heated by the induction heating apparatus 3. The starting material 2 charged into the melt 4 is thus completely inductively melted, and expands the melt 4.

An initial melting may take place in particular via a chemical redox reaction for producing a high local temperature, and then is no longer necessary during further continuous operation.

The melt 4 is present in the eutectic region in the phase diagram; the melt is formed essentially from α-alumina ($Al_2O_3$) and zirconia ($ZrO_2$), and is molten at approximately 1800° to 2000° C., i.e., above the eutectic solidification temperature of approximately 1700° C. The eutectic melt contains, in a manner known per se, approximately 54 to 61 weight percent $Al_2O_3$ and correspondingly 39 to 46 weight percent $ZrO_2$. In principle, further stabilizers or additives may be added, in particular rare earth oxides such as yttrium oxide ($Y_2O_3$), for example up to 6 weight percent $Y_2O_3$, and/or ceroxide and/or silicon oxide and/or other substances. In addition, a portion of the zirconium dioxide may be replaced by hafnium dioxide, which has practically the same chemical properties. It is important that a eutectic melt is formed from alumina and zirconia, which is basically known per se.

According to FIG. 1b), the melt 4 is discharged from the crucible 1 through an outlet and to an overflow 5, and in the present embodiment is applied as a thin layer 6 on a conveyor belt 7 which is continuously transported in the conveying direction F. The melt 4 may be scraped to the layer thickness d by a stripping apparatus 8, for example. The melt 4 is quenched upon contact with the conveyor belt 7, whereby the conveyor belt 7 may be temperature-controlled by water cooling, for example. The overflow 5 may likewise be heated by the induction heating apparatus 3 to prevent premature solidification of the melt 4 here.

The layer 6 has a layer thickness d of <2 mm, in particular <1 mm, for example; it may preferably be in the range of 0.1 to 0.8 mm, and advantageously already corresponds to the thickness of the subsequent abrasive grains.

The starting mixture 2 may be added continuously or in batches; the removal of the melt 4 via the overflow 5 advantageously takes place continuously and preferably automatically; i.e., melt 4 is discharged corresponding to the solid starting mixture 2 supplied in each case, whereby the overflow 5 may be throttled or stopped if necessary.

The cooling of the thin layer 6 from the melt temperature of approximately 1800° to 2000° C. to the solidification temperature of 1700° C. takes place very quickly, i.e., instantaneously, due to the relatively large surface of the thin layer 6 in relation to its layer thickness d, so that a very effective quenching process is achieved.

Due to the ongoing continuous removal, the discharged quantity of the melt 4 may be precisely metered in each case, so that a melt ridge, which could possibly result in premature solidification or irregularities, does not form in front of the stripping apparatus 8.

The solidified thin layer 6 subsequently cools on the conveyor belt 7 and may be removed at the end thereof; the solidified thin layer may break off due to its inherent load, so that it may subsequently be further ground into abrasive grains 9, if necessary, according to the schematic illustration in FIG. 1c), and may be classified into different abrasive grain sizes by screening, as is known per se. Since the thin layer 6 already has a layer thickness d corresponding to the abrasive grains 9, it is broken essentially laterally (within the plane).

Thus, the method according to FIGS. 1a) through c) has the following steps:

Step 101: introducing the solid starting mixture 2 into the crucible 1 in an already existing eutectic melt 4, Step 102: melting and retaining the heat of the introduced starting mixture 2 by inductive heating, Step 103: discharging the eutectic melt 4, preferably as continuous discharge, Step 104: quenching the eutectic melt 4 as a thin layer 6, Step 105: crushing/grinding the thin layer 6 (in the lateral direction) to form abrasive grains 9, Step 106: classifying the abrasive grains 9.

Figure 2:
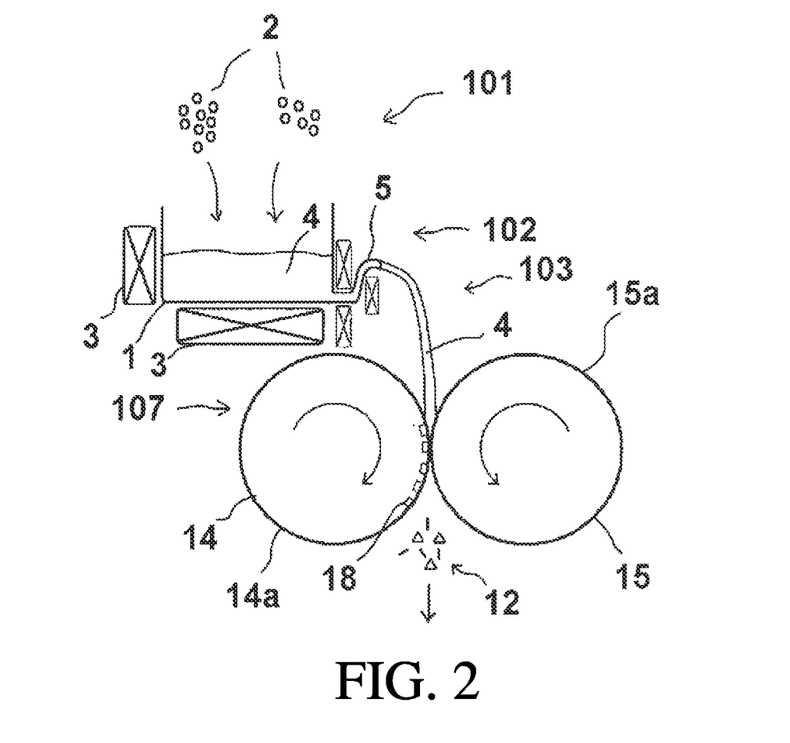
FIG. 2 shows a diagram of the production process according to another embodiment for producing shaped abrasive grains.

In the embodiment in FIG. 2, in principle the same crucible 1 may be used, from whose outlet 5 the eutectic melt 4 is once again continuously removed. However, this melt 4 is not subsequently processed into a continuously thin layer, but instead is directly processed into shaped abrasive grains 12. For this purpose, in the embodiment shown, two rollers 14 and 15 are provided which rotate in opposite directions, and between which the eutectic melt 4 is introduced from the top. Since the melt 4 is continuously introduced, the conveyed quantity may be adapted to the rotational speed of the rollers 14 and 15 in such a way that a melt ridge 16 which forms above the contact area of the rollers 14 and 15 is very small to negligible; according to the invention, the melt ridge may advantageously be punctiform or linear. Solidification of the melt 4 does not occur in this melt ridge 16. Thus, in this method as well, quenching of the melt 4 may be achieved instead of a gradual cooling with slow solidification.

The roller 14 shown on the left is colder, for example unheated or also actively cooled, for example by water cooling, for example at a temperature of less than 250° C., i.e., in the range of 30°-250° C., for example. Indentations 18 are formed on the surface 14a of the cold roller 14. In contrast, the roller 15 shown on the right is heated and has a surface 15a that is smooth, i.e., without significant indentations. The surface 15a may be heated to a surface temperature of 1000°, 1200°, or 1500° C., for example. As a result, the melt 4 of a melt ridge 16 which forms above the contact area does not solidify or cool too quickly between the rollers 14, 15. By use of the cold roller 14, rapid quenching is made possible when the melt 4 is received in the indentations 18.

Figure 3:
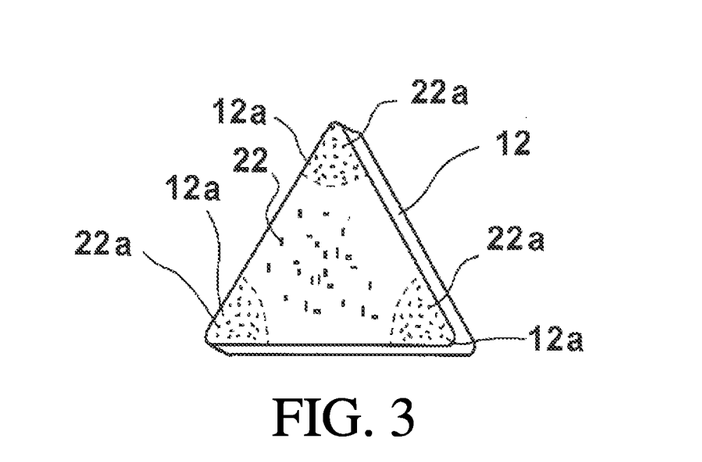
FIG. 3 shows an illustration of a shaped abrasive grain produced according to FIG. 2.

The indentations 18 may in particular have a triangular shape, and thus, according to FIG. 3, used for producing triangular abrasive grains 12, the triangular shape of which may preferably be equilateral to allow a high degree of symmetry. The abrasive grains may in particular have a prismatic shape (essentially identical top and bottom surfaces); however, in a departure therefrom a nonprismatic shape may be selected in which the top and bottom sides of the abrasive grains 12 are therefore different.

The shaped abrasive grains 12 shown in FIG. 3 are thus polycrystalline, and have an $Al_2O_3$ matrix containing $ZrO_2$ inclusions and segregations 22, 22a.

Figure 4:
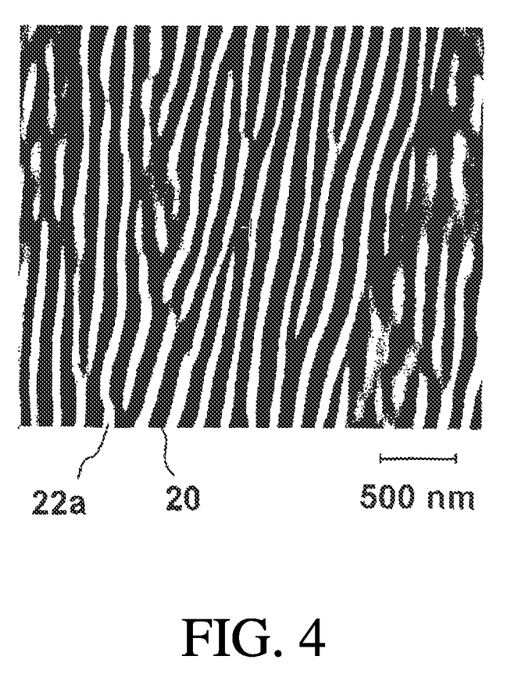
FIG. 4 shows an SEM image, i.e., a micrograph, of an abrasive grain according to the invention in one of its corner areas.

FIG. 4 shows a scanning electron microscope (SEM) image of such a corner area 12a ground for the preparation, with the scale and dimensions indicated. The $Al_2O_3$ matrix 20 is discernible as dark areas, and the $ZrO_2$ segregations 22a are discernible as white areas. Scales of 200 nm and 500 nm are illustrated. The $ZrO_2$ segregations 22a thus extend continuously in one or two dimensions over fairly large lengths, but their thickness, at least predominantly, is in the nm range, and in the present case is visible in the grinding plane at approximately 40 to 80 nm; slightly smaller values may possibly be discerned in another plane perpendicular to the direction of extension.

It is thus shown that in the corner areas 12a of the triangular shape of the abrasive grains 12 indicated by dashed lines in FIG. 3, $ZrO_2$ precipitates 22a in the nanoscale range, i.e., with thickness dimensions below 100 nm, in particular below 50 nm, occur, whereas the $ZrO_2$ precipitates 22 in the middle area of the abrasive grain 12 are larger. The smallest length dimension of the precipitates is understood as the thickness dimension, so that the nanoscale precipitates 22a may, for example, also extend lengthwise or in a spiral manner over a larger distance. The $ZrO_2$ precipitates 22a are smaller or smaller-scale than the precipitates 22 in the middle area, since the quenching process takes place more quickly in the corner areas 12a, since at this location the cooling occurs not only from the bottom side of the abrasive grain 12, but also from the side surfaces of the triangular shape, and therefore the ratio of the cooling surface to the volume is even smaller than in the middle area of the abrasive grain 12. Thus, a distance x between the precipitates 22a is also small, for example less than 250 nm, in particular less than 200 nm.

The nanoscale $ZrO_2$ segregations and the small distances x enhance the abrasive behavior. Since these corner areas 12a contribute significantly to the grinding performance when the abrasive grains 12 are used, an abrasive grain 12 having better grinding properties may thus be produced. The slightly larger $ZrO_2$ segregations 22a in the middle area are used for the general breaking strength of the abrasive grain.

The produced abrasive grains 12 may subsequently be directly removed.

The method according to the invention according to FIG. 2 therefore has the following steps:

Step 101: introducing, preferably continuously introducing, solid starting materials of the starting mixture 2 into the crucible 1, preferably in an already existing eutectic melt 4, Step 102: melting the starting mixture 2 by inductive heating, Step 103: discharging the eutectic melt 4, preferably as continuous discharge, and Step 107: Forming and quenching the eutectic melt 4 as shaped abrasive grains 12 between two surfaces 14a, 15a, in particular of rollers 14, 15.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. Method for producing polycrystalline zirconia-reinforced alumina ($Al_2O_3$) grains, comprising at least the following steps:
   a) inductively melting a solid starting mixture to form a eutectic melt composed of alumina and zirconia;
   b) applying the eutectic melt as a thin layer material having a layer thickness with quenching of the thin layer material;
   c) removing the thin layer material as grains;
   d) the grains being polycrystalline, formed without amorphous glass phases, and having an alumina matrix containing zirconia precipitates; and
   e) at least a portion of the zirconia precipitates are segregated in the nanoscale range, with greater than 50% of the zirconia precipitates having diameters less than 100 nm.

2. Method according to claim 1, wherein:
   a) the eutectic melt has additives, the additives including one of ceroxide, rare earth oxides, and silicon oxide.

3. Method according to claim 1, wherein:
   a) the solid starting material is charged into an existing inductively heated melt.

4. Method according to claim 1, wherein:
   a) the eutectic melt is continuously removed from an outlet of a crucible.

5. Method according to claim 4, wherein:
   a) the solid starting mixture is continuously supplied, and is removed via an overflow which is used as the outlet.

6. Method according to claim 1, wherein:
   a) the eutectic melt is applied continuously as a thin layer on a moving conveying surface, and solidifies, with quenching, with the layer thickness being less than 2 mm; and
   b) the solidified thin layer is subsequently crushed to form the abrasive grains having the layer thickness less than 2 mm, and is classified.

7. Method according to claim 1, wherein:
   a) the grains are formed as shaped abrasive grains directly from the eutectic melt.

8. Method according to claim 7, wherein:
   a) the eutectic melt is applied between two counter-rotating rollers; and
   b) one of the two rollers is an actively cooled roller which has indentations on its surface, for receiving the eutectic melt and for setting the shape of the shaped abrasive grains, and the other one of the two rollers is a temperature-controlled roller which has a smooth surface and is temperature-controlled, so that the surface of the temperature-controlled roller is warmer than the surface of the actively cooled roller.

9. Method according to claim 8, wherein:
   a) a linear or punctiform melt ridge of the applied eutectic melt forms above a contact area of the two rollers.

10. Method according to claim 1, wherein:
    a) the abrasive grains are formed with corner areas in which most of the zirconia precipitates are nanoscale.

11. Method according to claim 1, wherein:
a) the grains are abrasive grains.

12. Method according to claim 10, wherein:
a) the abrasive grains formed with corner areas in which most of the zirconia precipitates are nanoscale have a maximum thickness dimension less than 100 nm.

13. Method for producing polycrystalline zirconia-reinforced alumina ($Al_2O_3$) grains, comprising at least the following steps:
   a) inductively melting a solid starting mixture to form a eutectic melt composed of alumina and zirconia;
   b) applying the eutectic melt as a thin layer material having a layer thickness with quenching of the thin layer material;
   c) removing the thin layer material as grains;
   d) the grains being polycrystalline, formed without amorphous glass phases, and having an alumina matrix containing zirconia precipitates; and
   e) the eutectic melt being continuously removed from an outlet of a crucible.

14. Method according to claim 13, wherein:
a) the solid starting mixture is continuously supplied, and is removed via an overflow which is used as the outlet.

15. Method for producing polycrystalline zirconia-reinforced alumina ($Al_2O_3$) grains, comprising at least the following steps:
   a) inductively melting a solid starting mixture to form a eutectic melt composed of alumina and zirconia;
   b) applying the eutectic melt as a thin layer material having a layer thickness with quenching of the thin layer material;
   c) removing the thin layer material as grains;
   d) the grains being polycrystalline, formed without amorphous glass phases, and having an alumina matrix containing zirconia precipitates;
   e) the eutectic melt being applied continuously as a thin layer on a moving conveying surface, and solidifies, with quenching, with the layer thickness being less than 2 mm; and
   f) the solidified thin layer being subsequently crushed to form the abrasive grains having the layer thickness less than 2 mm, and is classified.

16. Method according to claim 15, wherein:
a) the layer thickness is in the range of 0.1-0.8 mm.

17. Method for producing polycrystalline zirconia-reinforced alumina ($Al_2O_3$) grains, comprising at least the following steps:
   a) inductively melting a solid starting mixture to form a eutectic melt composed of alumina and zirconia;
   b) applying the eutectic melt as a thin layer material having a layer thickness with quenching of the thin layer material;
   c) removing the thin layer material as grains;
   d) the grains being polycrystalline, formed without amorphous glass phases, and having an alumina matrix containing zirconia precipitates;
   e) the grains being formed as shaped abrasive grains directly from the eutectic melt;
   f) the eutectic melt being applied between two counter-rotating rollers; and
   g) one of the two rollers being an actively cooled roller which has indentations on its surface, for receiving the eutectic melt and for setting the shape of the shaped abrasive grains, and the other one of the two rollers being a temperature-controlled roller which has a smooth surface and is temperature-controlled, so that the surface of the temperature-controlled roller is warmer than the surface of the actively cooled roller.

18. Method according to claim 17, wherein:
a) the actively cooled roller is cooled at a temperature below 250° C.

19. Method according to claim 18, wherein:
a) the smooth surface of the temperature-controlled roller is temperature-controlled to temperatures in the range of 1000° to 1600° C.

20. Method according to claim 17, wherein:
a) the smooth surface of the temperature-controlled roller is temperature-controlled to temperatures in the range of 1000° to 1600° C.

21. Method according to claim 17, wherein:
a) the abrasive grains are formed with corner areas in which most of the zirconia precipitates are nanoscale.

22. Method according to claim 21, wherein:
a) the abrasive grains formed with corner areas in which most of the zirconia precipitates are nanoscale have a maximum thickness dimension less than 100 nm.

23. Method for producing polycrystalline zirconia-reinforced alumina ($Al_2O_3$) grains, comprising at least the following steps:
   a) inductively melting a solid starting mixture to form a eutectic melt composed of alumina and zirconia;
   b) applying the eutectic melt as a thin layer material having a layer thickness with quenching of the thin layer material;
   c) removing the thin layer material as grains;
   d) the grains being polycrystalline, formed without amorphous glass phases, and having an alumina matrix containing zirconia precipitates;
   e) the grains being formed as shaped abrasive grains directly from the eutectic melt; and
   f) the abrasive grains being formed with corner areas in which most of the zirconia precipitates are nanoscale.

* * * * *